United States Patent
Jechoux et al.

(12) United States Patent (10) Patent No.: US 11,139,928 B2
(45) Date of Patent: Oct. 5, 2021

(54) RELATING TO UL GRANT FREE TRANSMISSIONS-CONFIGURATION AND RESOURCE BUNDLING

(71) Applicant: JRD COMMUNICATION (SHENZHEN) LTD, Guangdong (CN)

(72) Inventors: Bruno Jechoux, Guangdong (CN); Umer Salim, Guangdong (CN); Sebastian Wagner, Guangdong (CN)

(73) Assignee: JRD COMMUNICATION (SHENZHEN) LTD, Guangdong (CN)

( * ) Notice: Subject to any disclaimer, the term of this patent is extended or adjusted under 35 U.S.C. 154(b) by 0 days.

(21) Appl. No.: 16/499,180

(22) PCT Filed: Aug. 10, 2018

(86) PCT No.: PCT/CN2018/099866
§ 371 (c)(1),
(2) Date: Sep. 27, 2019

(87) PCT Pub. No.: WO2019/033993
PCT Pub. Date: Feb. 21, 2019

(65) Prior Publication Data
US 2020/0177326 A1    Jun. 4, 2020

(30) Foreign Application Priority Data
Aug. 17, 2017    (GB) ..................... 1713231

(51) Int. Cl.
*H04L 1/18*    (2006.01)
*H04W 72/04*    (2009.01)
*H04L 5/00*    (2006.01)
*H04W 76/27*    (2018.01)

(52) U.S. Cl.
CPC .......... *H04L 1/1887* (2013.01); *H04L 5/0053* (2013.01); *H04W 72/042* (2013.01); *H04W 72/0413* (2013.01); *H04W 76/27* (2018.02)

(58) Field of Classification Search
None
See application file for complete search history.

(56) References Cited

U.S. PATENT DOCUMENTS

2016/0219627 A1    7/2016  Au et al.
2019/0393988 A1*  12/2019  Bae ..................... H04L 1/1812

FOREIGN PATENT DOCUMENTS

| CN | 102088775 A | 6/2011 |
| CN | 102158972 A | 8/2011 |
| CN | 106507486 A | 3/2017 |

(Continued)

OTHER PUBLICATIONS

"WF on procedures of grant-free transmission", 3GPP TSG RAN WG1 #89 R1-1709537, Hangzhou,China, May 15-19, 2017.

(Continued)

*Primary Examiner* — Ruihua Zhang
(74) *Attorney, Agent, or Firm* — BakerHostetler (57) ABSTRACT

Methods for allocating resources for uplink grant free data transmission from a UE to a base station. Resources are allocated by the base station and an indication transmitted to the UE, wherein the same resources are available to more than one UE. RRC policies define processes for the selection of resources for initial transmissions and re-transmission following collision.

3 Claims, 7 Drawing Sheets

Proposal for RV association to GF transmission occasions (56) References Cited

FOREIGN PATENT DOCUMENTS

| | | |
|---|---|---|
| CN | 106507497 A | 3/2017 |
| EP | 3 432 636 A1 | 1/2019 |
| WO | 2017/011942 A1 | 1/2017 |
| WO | 2017/167198 A1 | 10/2017 |
| WO | 2018/127201 A1 | 7/2018 |
| WO | 2019/014379 A1 | 1/2019 |
| WO | 2019/032748 A1 | 2/2019 |

OTHER PUBLICATIONS

"PRACH Preamble Format Design", 3GPP TSG-RAN WG1 NR Ad Hoc Meeting #2 R1-1711527, Qingdao, China, Jun. 27-30, 2017.
3GPP TSG RAN WG1 Meeting #87, "Discussion on UL grant-free transmission", R1-1611400, Nov. 14-18, 2016.
3GPP TSG RAN WG1 #89, "WF on procedures of grant-free transmission", R1-1709537, May 15-19, 2017.

* cited by examiner

Figure 1 – Conventional resource allocation for grant free UL, single UE per resource chunk, GF opportunity every 2 slots, K=3

Figure 2 – Conventional resource allocation for grant free UL, single UE per resource chunk with frequency hopping, GF opportunity every 2 slots, K=3

Figure 3- Multi UEs allocation per resource chunk

Figure 4- Multi UEs allocation to a set of common resource chunks

Figure 5: RV association to GF occasion

Figure 6: RV association to FG occasion – Problem with conventional approach

Figure 7 : Proposal for RV association to GF transmission occasions

RELATING TO UL GRANT FREE TRANSMISSIONS-CONFIGURATION AND RESOURCE BUNDLING

CROSS-REFERENCE TO RELATED APPLICATIONS

This application is a National Stage of International patent application PCT/CN2018/099866, filed on Aug. 10, 2018, which claims priority to foreign Great Britain patent application No. GB 1713231.7, filed on Aug. 17, 2017, the disclosures of which are incorporated by reference in their entirety.

TECHNICAL FIELD

Embodiments of the present invention generally relate to wireless communication systems and in particular to devices and methods for enabling a wireless communication device, such as a User Equipment (UE) or mobile device to access a Radio Access Technology (RAT) or Radio Access Network (RAN), particularly but nor exclusively to improvements in or relating to UL Grant Free Transmissions—Configuration and Resource bundling.

BACKGROUND

Wireless communication systems, such as the third-generation (3G) of mobile telephone standards and technology are well known. Such 3G standards and technology have been developed by the Third Generation Partnership Project (3GPP). The $3^{rd}$ generation of wireless communications has generally been developed to support macro-cell mobile phone communications. Communication systems and networks have developed towards a broadband and mobile system.

The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB.

In the following, we focus on the 5G NR services which require lower latency transmissions compared to other services. Typically, these services will require the transmission of high priority infrequent small to medium sized data packets which may be transmitted through grant free UL transmissions. These grant-free transmissions can be scheduled autonomously by the UEs within the policies and configurations set by gNB via RRC.

Following are the 3GPP agreements relevant to grant free UL transmission.

RAN1#NR-AH2 (June 2017)
Type of UL data transmission without grant
Type 1: UL data transmission without grant is only based on RRC (re)configuration without any L1 signalling
Type 2: UL data transmission without grant is based on both RRC configuration and L1 signalling to activation/deactivation for UL data transmission without grant
Note: functionality of modification is achieved the L1 signalling by activation
Type 3: UL data transmission without grant is based on RRC configuration, and allows L1 signalling to modify some parameters configured by RRC but no L1 signalling for activation
For UL data transmission without grant, type 1 and type 2 have already been agreed, FFS type 3.
FFS the reliability issues for L1 signalling.
For Type 1 UL transmission without UL grant, the RRC (re-)configuration includes at least the following
Periodicity and offset of a resource with respect to SFN=0
Time domain resource allocation
Frequency domain resource allocation
UE-specific DMRS configuration
Note:
one TB is mapped to a resource at least consisting of time/frequency-domain resource
RAN1 will not introduce specific resource allocation and DMRS configuration for UL data transmission without grant separate from UL data transmission with UL grant within the Rel.15 WI
An MCS/TBS value
Number of repetitions K
Power control related parameters
FFS HARQ related parameters
FFS if multiple resources can be configured
For Type 2 UL transmission without UL grant
The RRC (re-)configuration for resource and parameters includes at least the following
Periodicity of a resource
Power control related parameters
At least the following additional parameters for the resource are given by L1 signalling
Offset associated with the periodicity with respect to a timing reference indicated by L1 signalling for activation
FFS: the timing reference
Time domain resource allocation
Frequency domain resource allocation
UE-specific DMRS configuration
An MCS/TBS value
Note:
one TB is mapped to one resource
RAN1 will not introduce specific resource allocation and DMRS configuration for UL data transmission without grant separate from UL data transmission with UL grant within the Rel.15 WI
FFS multiple resources can be configured
FFS HARQ related parameters
FFS whether number of repetitions K is configured by RRC signalling and/or indicated by L1 signalling
In addition to the RS parameters, time and frequency resource are configured in a UE-specific manner.
Note: it is common understanding that the time and frequency resources configured for a UE may or may not collide with those for another UE (to be captured in the LS).
NR supports more than 1 HARQ process for UL transmission without grant
RAN1 considers that UE transmitting UL transmission without UL grant can be identified based on time/frequency resources and RS parameter(s).
RAN1 considers that UE transmitting UL transmission without UL grant can be identified based on time/frequency resources and RS parameter(s).
For Configurations:
RAN1#NR-AH1 (January 2017)
For an UL transmission scheme without grant at least semi-static resource (re-)configuration is supported FFS: The resource configuration includes at least physical resource in time and frequency domain and RS parameters Higher-layer signalling could be similar to Rel-8 LTE SPS

FFS: MCS

RAN1#88

For UL transmission without grant,

The resource configuration includes at least the following

Time and frequency resources, FFS: including resources for repetitions, implicitly or explicitly Modulation and coding scheme(s), possibly including RV, implicitly or explicitly Reference signal parameters FFS: Details FFS: The number of repetitions K FFS: Whether multiple number of K can be configured to one UE FFS other parameters

RAN1#89

If network configures, UL data transmission without UL grant can be performed after semi-static resource configuration in RRC without L1 signalling if network configures, L1 signalling for activation/deactivation and/or modification on parameters for UL data transmission without UL grant can be applied RAN1 is discussing whether the mechanism to distinguish UL SPS and UL data transmission without UL grant is necessary.

"semi-static resource configuration in RRC" agreed by R1-1709537 includes UE-specific semi-static configuration for RS.

3GPP Agreements for Repetition and Retransmission of Grant Free UL Transmissions RAN1#NR-AH1 (January 2017)

For an UL transmission scheme with/without grant

K repetitions including initial transmission (with the same or different RV and FFS with different MCS) (K>=1) for the same transport block are supported, FFS the way K is determined FFS: hopping mechanisms over the transmissions

RAN1#88

For UL transmission without grant,

FFS: A UE may continue repetitions for a TB until one of the following conditions is met An ACK is successfully received from gNB The number of repetitions for the TB reaches K For UE configured with K repetitions for a TB transmission with/without grant, the UE can continue repetitions (FFS can be different RV versions, FFS different MCS) for the TB until one of the following conditions is met if an UL grant is successfully received for a slot/mini-slot for the same TB FFS: How to determine the grant is for the same TB FFS: An acknowledgement/indication of successful receiving of that TB from gNB The number of repetitions for that TB reaches K FFS: Whether it is possible to determine if the grant is for the same TB Note that this does not assume that UL grant is scheduled based on the slot whereas grant free allocation is based on mini-slot (vice versa)

Note that other termination condition of repetition may apply 3GPP Agreements for Channel Structure of Grant Free UL Transmissions RAN1#NR-AH1 (January 2017)

For an UL transmission scheme without grant

RS is transmitted together with data channel structure of grant-based data transmission can be starting point

RAN1#88

At least for CP-OFDM, NR supports a common DMRS structure for DL and UL

DMRS for same or different links can be configured to be orthogonal to each other.

FFS exact DMRS location, DMRS pattern, and, scrambling sequence for the common DMRS structure.

Support PN sequence for CP-OFDM

FFS: ZC-sequence for CP-OFDM

RAN1#88bis

Support ZC-sequence for UL DFT-S-OFDM DMRS

RAN1#NR-AH2 (June 2017)

WA: Both DFT-S-OFDM and CP-OFDM are supported for UL transmission without grant.

3GPP Agreements for Time Advance and Power Control of Grant Free UL Transmissions For Timing advance (TA), power control etc. mechanisms for NR UL data transmission:

RAN1#NR-AH2 (June 2017)

The same TA adjustment procedure/mechanism (including expiration of TA timer) is applied to UL transmission with and without UL grant For UL transmission without UL grant, Open-loop power control based on pathloss estimate is supported.

FFS: Closed-loop power control is supported, which is based on NW signalling.

A UE shall not transmit anything on configured resources for UL transmission without UL grant when there is no transport block to transmit.

FFS: UCI piggybacking with transport block is supported for UL transmission without UL grant.

Grant free UL transmission is currently a hot topic in RAN1, it has been the object of multiple agreements in recent meetings, in particular 30 Tdocs and 4 agreements in last 3GPP TSG RAN WG1 NR Ad-Hoc #2 (Qingdao)

For Type 1 and Type 2 UL transmission without grant, it has been agreed that a separate UL resource is assigned with a certain periodicity to UEs operating in grant free UL Tx by RRC. In addition, RRC configures a TBS/MCS value and a number of repetition K.

Another Agreement is that

In addition to the RS parameters, time and frequency resource are configured in a UE-specific manner.

Note: it is common understanding that the time and frequency resources configured for a UE may or may not collide with those for another UE (to be captured in the LS).

Therefore it is agreed that a same chunk of resource for grant free Tx can be assigned to different UEs which can then be differentiated by their DMRS which is UE-specific.

As grant free transmission is user initiated, gNB must identify the user and the HARQ related parameters of the transmission. In LTE, these were configured in the DCI which would not be possible here for grant free transmissions.

Accordingly, the present invention is seeking to address some or all of the issues relating to pre-reserved resource assignment, RV indication and PID indication.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a first aspect of the present invention there is provided methods and system for allocation of UEs to a set of common pre-reserved resource for UL GF.

Preferably, gNB send NAK with a collision indication.

Preferably, UEs use a random policy in frequency and time domain to select the resource for next transmission Preferably, low latency UEs retransmissions are preferably randomized in frequency dimension while others are preferably randomized in time dimension Preferably, RRC configuration is unique for all the chunks (same TBS/MCS)

Preferably, if RRC configures several TBS within the set of resource chunks, UEs performs randomization over the subset of Chunks having a configuration compliant with their upcoming payload sizes.

According to a further aspect there is provided a UL Grant free transmission where HARQ process number is sent explicitly as uplink control information by puncturing the data resource elements.

According to a further aspect there is provided a UL Grant free transmission where HARQ process number is sent explicitly as uplink control information by rate-matching the data resource elements.

Preferably, the data resource elements which are effectively used to transmit HARQ process number are selected so as to have robust detection, thanks to their proximity to the reference symbols.

According to a further aspect there is provided for the UL grant free transmission, redundancy version can be associated to grant free occasions and is not signalled explicitly.

According to a further aspect there is provided User transmits data on the first available GF occasion using the RV associated to this occasion from the established RV sequence. For the remaining K−1 repetitions, it continues with this RV sequence in a circular manner.

Preferably, the invention can be used for re-transmission in the Grant Free UL based communication.

According to a further aspect there is provided in case of grant free UL transmission configured for K repetitions, gNB can send FAST ACK before it has received all of the K repetitions.

According to a further aspect there is provided upon receiving FAST ACK before transmitting all K repetitions of GF UL, user stops immediately and further repetitions are not transmitted.

According to a further aspect there is provided for UL GF transmissions, gNB can send FAST NAK to a user before it has received all K repetitions.

Preferably, the NAK can be an explicit NAK or it can be in the form of an UL grant scheduling user over different dedicated resource.

Preferably, FAST ACK or NAK can be sent in a group common DC.

Preferably, the group common DCI can be for the group of users who have been allocated same GF UL resources.

Preferably, after the K repetitions, if the UE receives neither HARQ response nor an UL grant for the same TB, it can restart GF transmission of the same TB in the next available GF occasion.

Preferably, the Radio Access Network is a New Radio/5G network.

According to another aspect of the present invention there is provided a base station or a UE adapted to perform the method of another aspect of the present invention.

According to another aspect of the present invention there is provided a non-transitory computer readable medium having computer readable instructions stored thereon for execution by a processor to perform the method of another aspect of the present invention.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION OF THE PREFERRED EMBODIMENTS

Those skilled in the art will recognise and appreciate that the specifics of the examples described are merely illustrative of some embodiments and that the teachings set forth herein are applicable in a variety of alternative settings.

The present invention targets uplink (UL) grant free (GF) transmissions in new radio (NR). UL grant free transmissions are being standardized in NR for URLLC type of services to reduce the latency. More specifically the present invention focuses on How to assign pre-reserved resource to UL GF UEs and to select a given UL GF resource for transmission How to identify user and HARQ related parameters when a user transmits on UL GF resource. It also discusses on ACK/NAK procedure and early termination possibility for UL GF transmissions.

UL GF has been the object of multiple agreements in recent meetings, in particular 30 Tdocs and 4 agreements in last 3GPP TSG RAN WG1 NR Ad-Hoc #2 (Qingdao)

In LTE, UL transmissions were configured by eNB in the DL control information so eNB knew precisely what would be coming at certain time instants, slots of sub-frames. In UL Grant free transmission, the UE autonomously triggers its transmission whenever it has buffer to transmit, using a T-F resource within a set of pre-reserved resource. This invention proposes enhancements to the pre-reserved T-F resource allocation and to the UE selection of transmit opportunity.

In addition, with the possibility of having multiple users associated the same time frequency resource and UL transmission skipping possibility, gNB needs to identify the user who transmitted data in a particular transmission occasion, it also further needs to know HARQ related parameters, namely HARQ process ID and redundancy version (RV) in case of multiple transmissions configured. This invention proposed efficient methods and associated signalling to convey these parameters to gNB. It further describes an early termination mechanism for the cases where additional transmissions may not be required.

This invention proposes methods enhance the resource usage and collision rates of UL grant free transmissions, thus enhancing capacity, robustness and latency for UL grant free mode of operation.

- It proposes a new allocation mechanism for UL GF pre-reserved T-F resource. This mechanism assigns multiple UEs to a set of resource to reduce the amount of pre-reserved unused resource and increase the resource usage flexibility for the UE.
- It proposes a random based resource selection mechanism for the UE to select its GF UL Tx opportunity. This leverages the above proposal and reduce collision rates in a latency-optimized manner.

This invention also proposes methods to ensure complete understanding of UL grant free transmission from the users, thus leaving no ambiguity on HARQ process number and RVs.

- It proposes a new design of associating and using RV for K transmission of UL Grant free where no explicit information is sent and there is no latency and user is allowed to transmit in the first available UL GF occasion.
- It proposes an early termination mechanism through which in case of successful decoding, additional transmission of the same TB can be avoided, thus providing significant advantage in system spectral efficiency and user energy efficiency.

Pre-Reserved Resource Assignment for Grant Free UL Transmissions

Issue with allocation of a single UE per resource chunk for grant free UL transmission Taking into account that the SPS are assigned in a periodical manner while the traffic for grant free UL Tx UEs is generally not periodical, it appears that assigning a single UE per pre-allocated resources would constitute a vast capacity loss due to unused resources and would drastically limit the number of grant-free UEs which can be served per cell and per unit of time.

Figure 1:
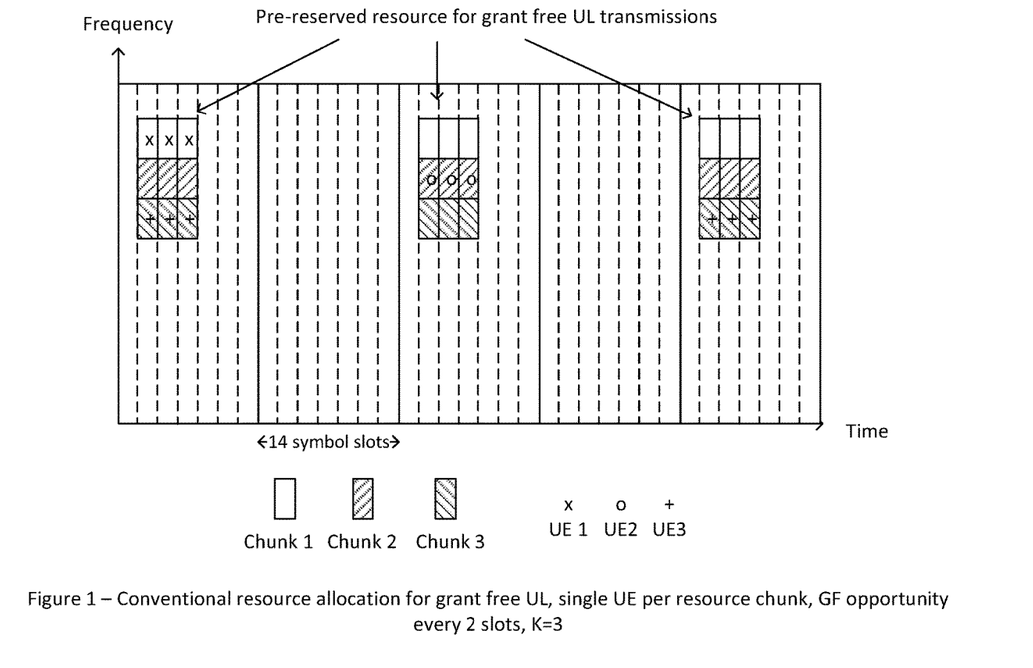
FIG. 1 shows a conventional resource allocation for grant free UL, single UE per resource chunk, GF opportunity every 2 slots, K=3.

FIG. 1 shows a Conventional resource allocation for grant free UL, single UE per resource chunk, GF opportunity every 2 slots, K=3

Figure 2:
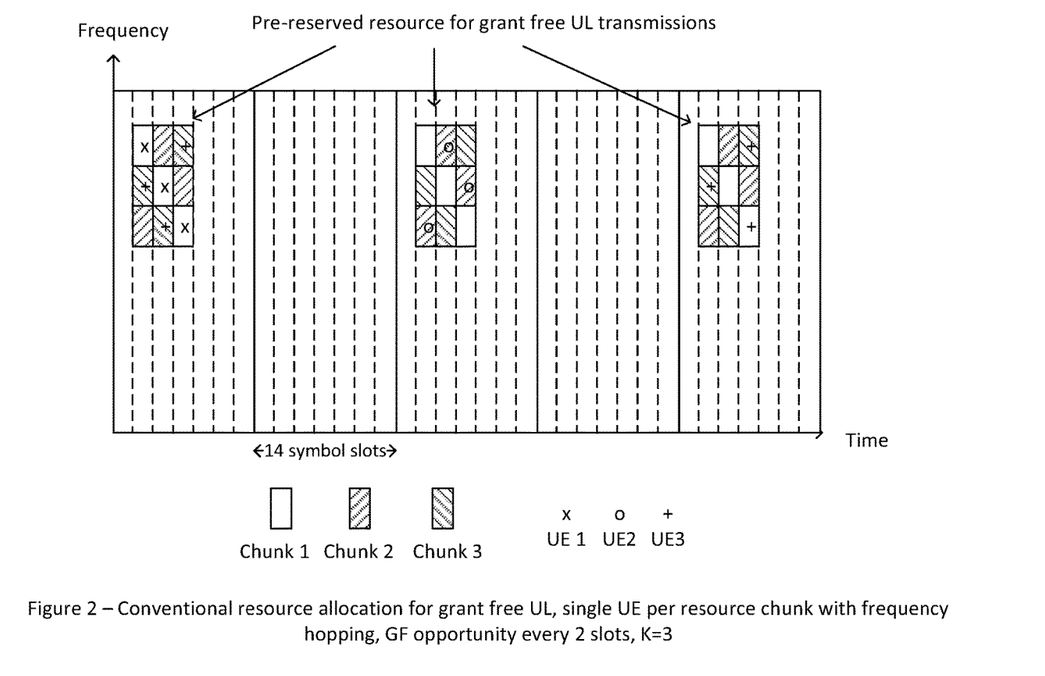
FIG. 2 shows a conventional resource allocation for grant free UL, single UE per resource chunk with frequency hopping, GF opportunity every 2 slots, K=3.

FIG. 2 shows a Conventional resource allocation for grant free UL, single UE per resource chunk with frequency hopping, GF opportunity every 2 slots, K=3

FIG. 1 and FIG. 2 show a case where 3 different chunks of resources are assigned for grant free UL respectively without and with frequency hopping, each of them assigned to a dedicated UE. In order to support the stringent latency requirement of UrLLC, gNB must allocate periodic resource with rather small periodicity, but on the other side UrLLC UE transmissions are infrequent, and in general not periodic. This leads to significant amount of unused resource per each allocated UE which cannot be re-used by the others.

As a consequence, a significant amount of resource pre-allocated to each UE. In addition the wasted resource by all UEs add up and this approach doesn't scale well at all with increasing number of grant-free UE's.

Issue with Allocating Several UEs in a Single Resource Chunk

In order to limit the resource wasting, a solution is to assign multiple UE's per pre-reserved chunk of resource. By doing this the amount of unused resource is reduced at the cost of inter UE collisions.

Collision cases has to be handled carefully, as if 2 transmissions from different UEs collide and the collision prevent any of the payloads to be decoded, this creates room for continuous collision (deadlock).

Figure 3:
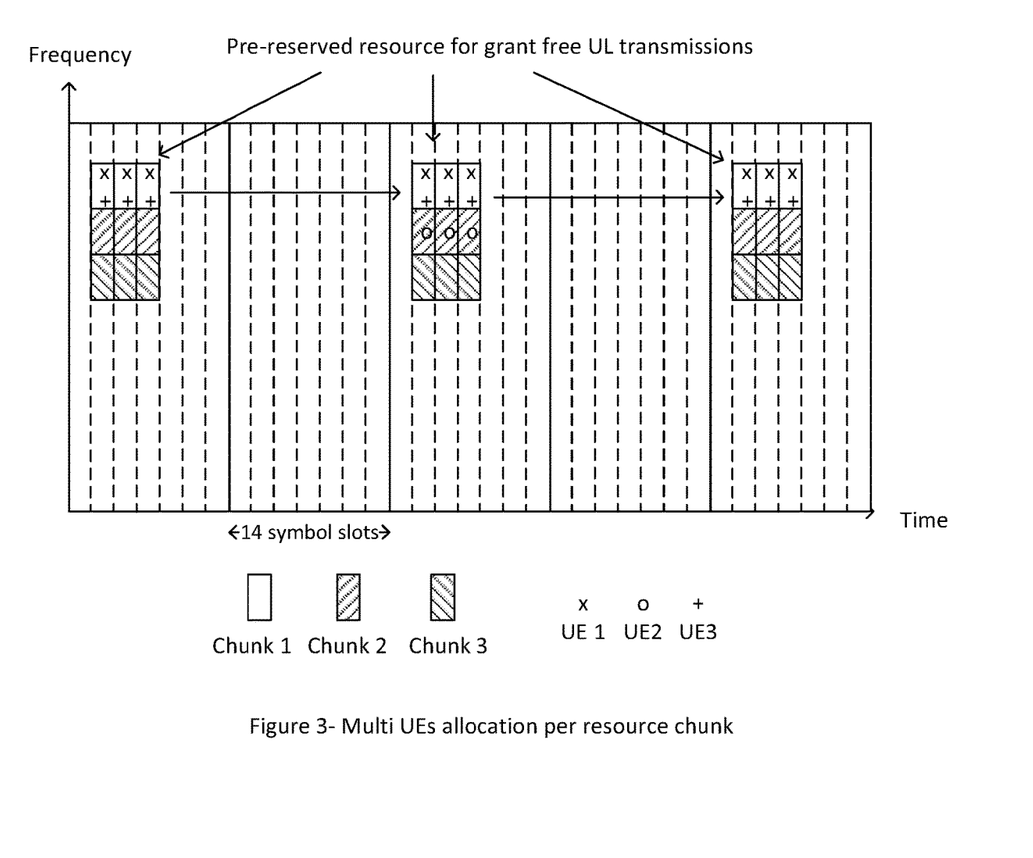
FIG. 3 shows a multi UEs allocation per resource chunk.

FIG. 3 shows a Multi UEs allocation per resource chunk.

FIG. 3 illustrates such as case, where UE1 and UE3 are allocated to Chunki, following the initial collision, the UEs both attempt to reTx immediately hence creating again a collision.

If several UEs are assigned to a resource chunk, there is a certain collision likelihood which drastically increases with the number of UEs and with their activity duty cycle. In addition, there is a risk of repetitive collision consecutive to the initial collision. This would harm both reliability and latency of grant free UL Tx UEs which is a serious flaw for UrLLC UEs.

This can be partially mitigated in randomizing the retransmission to minimize collision risks for next Tx attempt. However, randomization can be applied only in time domain as each resource Chunk can contain only a full TBS, therefore traffic latency would still be harmed but with a less magnitude. It must be noted though that with this mitigation method, extra latency would harm any retransmitting UE, even in absence of collision (e.g. retransmission due to bad radio conditions).

In the meantime, since UEs can to differentiated by their RS, gNB has to listen to all the possible RS corresponding to the UEs assigned in this Chunk, therefore thanks to the RS orthogonality or quasi orthogonality, presence of several UE transmissions is detected at gNB which can hence feedback collision info to the UE so that this one can adapt its behavior accordingly and avoid applying randomization in absence of collision (latency penalty only paid for collision cases, avoid increasing interference due to Tx power ramp up).

In case of multiple UEs allocated to a single pre-reserved resource chunk, gNB send NAK with collision indication.

New allocation scheme, multiple UE allocation onto multiple resource chunks.

As a Summary on the Above Allocation Modes,

Allocation Mode 1: Single UE Allocated to Each Resource Chunk

- Latency requirements impose to have resource frequently allocated
- Frequent resource assignment for infrequent UE transmissions
- Impact on cell capacity for grant free UL The Invention Proposes Allocation Mode 2: Multiple UE's Allocated to a Single Resource Chunk Enhanced Resource Usage Collision Risks impact on grant free UL reliability and latency As a solution to fix the inherent bottlenecks detailed above, a new allocation mode is proposed where multiple UEs are allocated to a common set of resource chunks. UE shall select resources for their GF transmission within this common set. Main advantage of this new allocation mode is additional flexibility for UE GF transmission coupled to lower percentage of unused resource.

The invention proposes to allocate several UEs to a set of common resource chunks.

It must be noted that pre-reserved resource can be assigned on a slot basis or on or a mini-slot basis, in the first case the different chunks are advantageously separated in frequency dimension to provide resource selection flexibility in frequency and hence limit the latency impact, in the second case both frequency and time separation can be used as can both satisfy UrLLC latency requirements.

Resource Selection Policies for Grant Free UL Transmissions

Proposed allocation method 3 provides more flexibility and better resource usage than modes 1 & 2 however it does not solve the issue of continuous collision. However, a simple resource selection rules including some random component can be applied at UE level to select the transmission chunk to be used by the UE at next GF opportunity. UE shall be identified by the gNB based on its RS (as currently agreed).

Collision Risks Still Exist, but the Major Interests of this Solution are that:
 it suppresses the risk of continuous collision between 2 UEs along their respective Tx repetitions.
 randomization of GF opportunity selection can be performed by the UE in in frequency dimension which has the very desirable effect of minimizing latency impacts. Latency being a key Kpl for GF Tx.
 In addition to the preferred frequency domain randomization, time domain randomization is also possible as a complementary degree of freedom if certain classes of UEs can accept the corresponding latency penalty.

Each UE can then select randomly or partially randomly based on some pre-defined RRC policies the resource for its initial transmission and for potential retransmissions within the set of resource chunks configured by gNB. For retransmissions, different classes of UEs depending on their latency requirements can be defined so that they privilege frequency or time in their randomization scheme.

Figure 4:
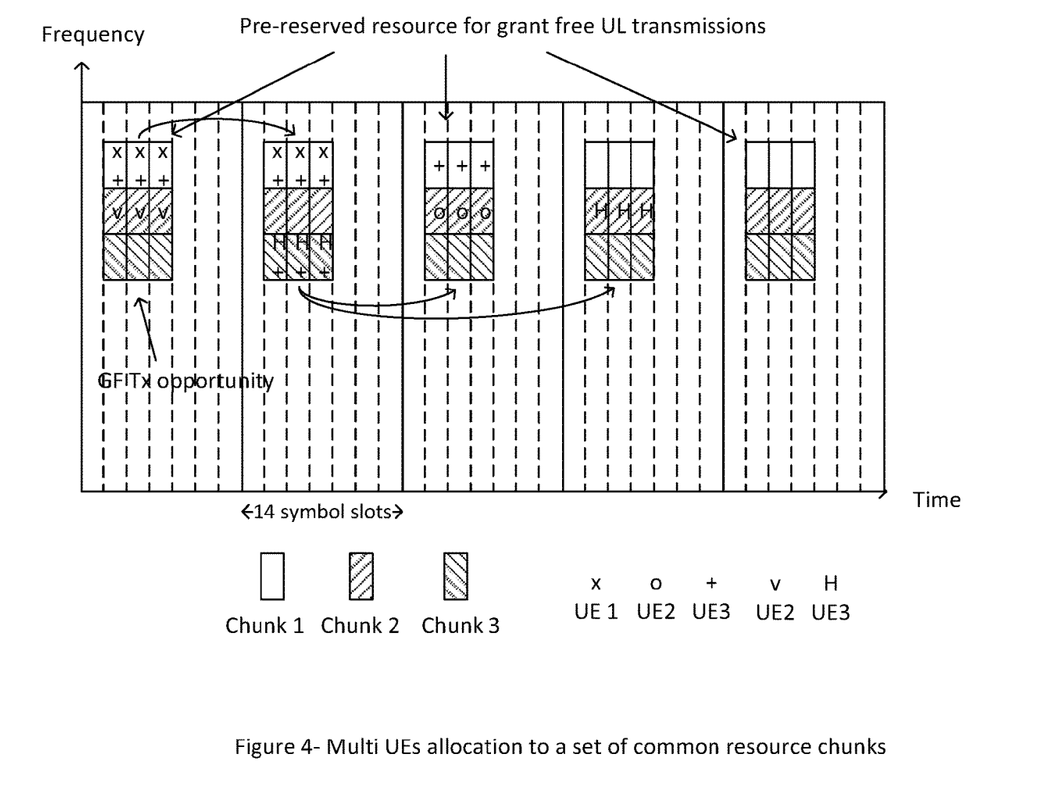
FIG. 4 shows a multi UEs allocation to a set of common resource chunks

FIG. 4 shows a Multi UEs allocation to a set of common resource chunks

FIG. 4 illustrates allocation mode 3 with 3 resource chunks allocated to 5 UEs (K=3). A first collision occurs between UE1 and UE3 which is resolved with minimal latency impact thanks to frequency based randomization of the re-transmission. A second collision occurs between UE3 and UE5 which is resolved in time and frequency domain, UE5 hence experiencing a higher latency penalty than UE3 in the resolution process.

Design of efficient randomization patterns with controlled fairness is much easier if the resource chunks are of the same size, it is hence proposed that the different resource chunks allocated to a set of UEs have the same TBS size.

The invention proposes RRC configuration is unique for all the chunks (same TBS/MCS)

The invention proposes UEs select randomly, using uniform random drawing, the GF transmit opportunity they shall use for their upcoming GF transmission within the set of pre-reserved chunks of resource assigned to them.
 Option 1: random selection is performed in frequency direction only and applies immediately (in the next set of pre-reserved resources). Option preferred for slot based GF.
 Option 2: random selection is to perform frequency and time dimension.

The invention proposes Define classes of UEs where low latency UEs retransmissions are preferably randomized in frequency dimension while others are preferably randomized in time dimension If chunk size restriction to a unique value cannot be applied for any reason, then time-frequency randomization can still be applied but with less flexibility on latency optimization. In that case resource chunks are categorized w.r.t. their sizes and the UEs can apply randomization on the set of chunks compatible with their upcoming payload size.

The invention proposes if RRC configures several TBS within the set of resource chunks, UEs performs randomization over the subset of Chunks having a configuration compliant with their upcoming payload sizes.

Configuration for UL Grant Free Transmission

For UL transmission without grant, a set of resources are pre-allocated to the terminal for a certain period and the UE can start its transmission without waiting for the downlink scheduling message. When a user does not have relevant data in its buffer, it would not transmit anything on its pre-assigned UL grant free time frequency resource (explicitly agreed in 3 gpp). There is common understanding that multiple UEs would be sharing the grant free resource. So, in case of multiple UEs sharing the same time frequency resource and the UL transmission skipping possibility, gNB needs to identify the user who transmits data in a certain grant free resource, among the set of users to whom this resource was allocated. 3GPP has made an agreement to support more than one HARQ processes for grant free UL. This implies that there must be some mechanism for gNB to identify the HARQ process number. Furthermore, as 3GPP has accepted up to K repetitions of the same transport block with same or different redundancy versions (RVs), gNB needs to know precisely the RV of the received transmission to be able to combine these versions properly.

To sum up, contrary to grant based transmission configuration where gNB configures in the DL HARQ process ID (HPID) and RV to a specific user on a specific resource, in grant free transmission gNB must somehow know these parameters to identify the user and combine/demodulate the HARQ data. Making progress in this direction, 3GPP has already agreed in R1-AH2 Qingdao meeting that UE identification can be achieved through time frequency resource and DMRS configuration. This implies that the users who are allocated the same time frequency resource for possible grant free UL transmissions, must be configured with different DMRS sequences. Having achieved UE identification, gNB still needs to know HPID and RV.

For HPID, if a UE is configured with a single HARQ process, there is no need to indicate HPID. In case of UE configured with GF transmission for multiple HARQ processes, to avoid any misunderstanding between UE and gNB for transmissions and retransmissions, it is proposed that UE transmits this explicitly as part of uplink control information (UCI).

It has been proposed to send HPID in UCI. Our proposal gives further possibilities how to send UCI by puncturing or rate matching.

To send UCI along with UL data, there are two possibilities:
 HPID (UCI) can be sent by puncturing a certain number of resource elements in uplink data as is done to convey DL HARQ ACK/NAK in LTE. As HPID is important information which should be decoded at gNB correctly before the data itself, following the LTE HARQ ACK/NAK transmission in the UL, resource elements can be selected at robust positions, for example very close to DMRS.

The other possibility to send HPID in UCI along with UL data is by doing the rate matching. This strategy was adopted in LTE to send DL CQI, PMI and RI in the uplink direction within data assigned resource elements.

As only very few bits would be required to convey the HPID, sending HPID (UCI) by puncturing could be more interesting compared to sending it by rate-matching the PUSCH which would add additional processing complexity at the user.

The invention proposes HPID can be sent explicitly in the UCI. This can be added in PUSCH data by puncturing over the data elements. The resource elements punctured in PUSCH to be used for HPID transmission can be selected based upon their location such that are more robust due to their localization.

The invention proposes for the original UL grant transmission, RV can be sent to gNB implicitly by associating RV to the UL grant free occasion. To avoid waiting for a suitable occasion for a fixed RV sequence, RV sequence can be fixed but can be started anywhere in a circular fashion.

For the re-transmission, RV or RV sequence can be indicated by the gNB explicitly, or from a mapping table or it could be an implicit agreement where RV for retransmission is associated to the resource.

Figure 5:
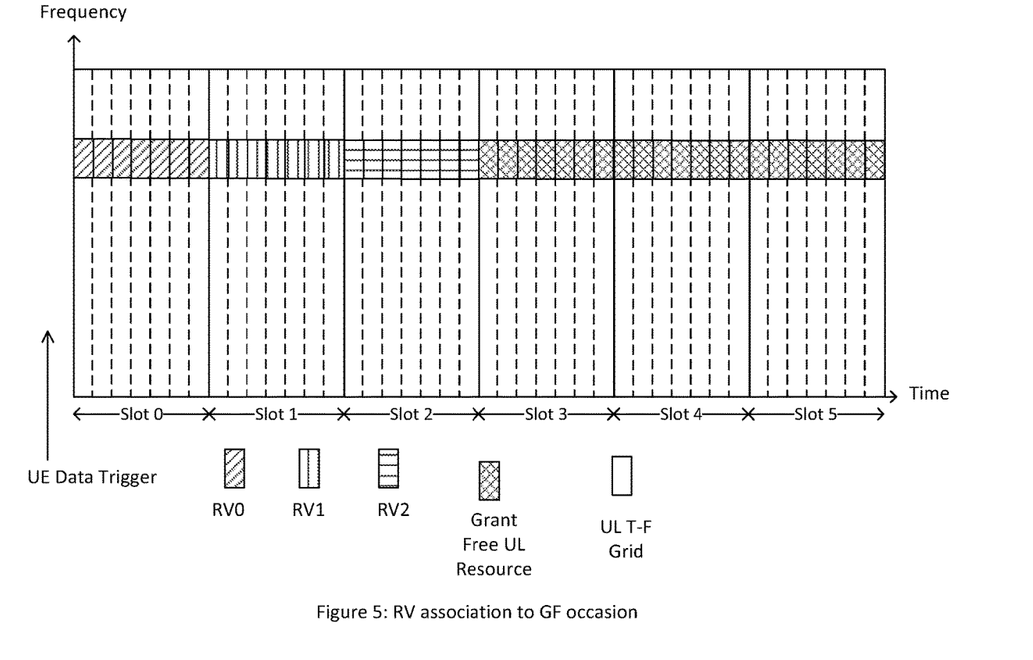
FIG. 5 shows an RV association to GF occasion

If conventionally RVs of K transmissions are associated to UL grant free occasions, and the sequence of RVs is a fixed sequence consisting of 3 versions RV0, RV1 and RV2, the transmission of K=3 would look like as shown in the following figure. Here it is assumed that grant free occasion module 3 would dictate when UE can transmit. This example shows that grant free (GF) resource has been configured in each slot and each slot makes a GF transmission occasion. Then transmission must start from RV0 which can be transmitted in slots numbered 0, 3, 9 and so on.

FIG. 5 shows an RV association to GF occasion

In this FIG. 5, UE receives data from upper layers before slot 0 with some margin to be able to encode etc, and it starts transmitting RV0 in slot 0. Here latency is minimal.

Figure 6:
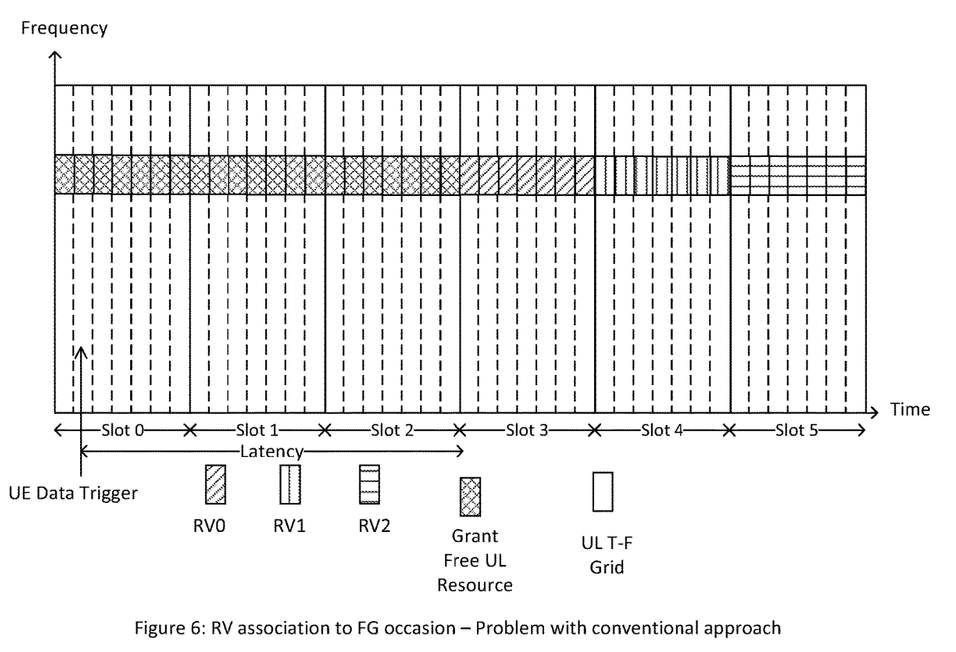
FIG. 6 shows an RV association to FG Occasion including Problem with conventional approach

FIG. 6: RV association to FG Occasion—Problem with conventional approach

If data trigger from higher layers arrives a bit later somewhere in slot 0 for example, as shown in FIG. 6: RV association to FG Occasion—Problem with straightforward approach, UE has to wait next module K occasion to be able to start transmitting. With the settings taken here, UE has to wait more than 2 full slots to be able to start with RV0 in slot #3. As the main motivation for the GF transmissions is to reduce the latency and the round-trip time due to scheduling grants, this latency of multiple GF occasions may not be acceptable for URLLC services.

Figure 7:
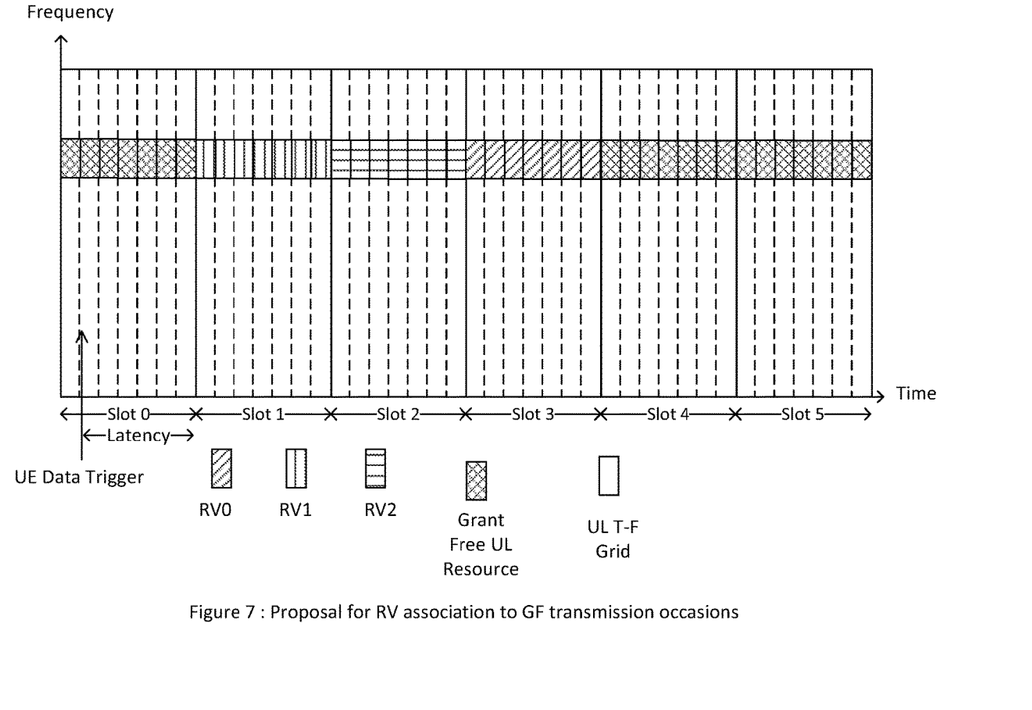
FIG. 7 shows a Proposal for RV association to GF transmission occasions, according to an embodiment of the present invention.

This limitation can be overcome by keeping the same RV sequence and same mapping to resource but allowing the LUE to transmit at any GF occasion with the corresponding RV and then continue with the full RV sequence in a circular buffer fashion. An example is shown in FIG. 7: Proposal for RV association to GF transmission occasions.

FIG. 7 shows a proposal for RV association to GF transmission occasions

When GF UL is configured with K repetitions, a UE can start at any occasion and then sequentially cycles through the repetitions.

Suppose K=3 repetitions are configured and indices of RV versions are the following:
RV_Sequence:
rv[0]=0, rv[1]=2, rv[2]=3 (close to LTE UL Non-adaptive HARQ RV sequence)

GF Transmission occasions (within a slot, or sub-frame or even longer interval T) can be implicitly assigned a number. When UE has to transmit a packet in occasion number N, it may transmit an RV version which corresponds to the index through the following:
index=N % K Thus, the first transmission from the UE would be for the version which corresponds to rv[index], and the upcoming K−1 transmissions would follow the RV Sequence in a circular manner.

FIG. 7 shows that with the proposed mechanism, each GF occasion is associated to one RV from the RV sequence. As soon as UE receives data from higher layers and is able to transmit, it transmits the transport block in the first available GF occasion by choosing the RV which corresponds to this occasion. In this figure, as data trigger arrives in slot 0, UE prepares all RVs and in the first available slot, slot #1 here, it starts with RV1 and then rest K−1 transmissions are done over the RV sequence in a circular manner. This shows the significant latency advantage of the current proposal with respect to the conventional approach.

Early Termination and Associated Signalling

If grant free (GF) UL is configured with K repetitions, following may happen:

If gNB is able to successfully decode the transport block (TB) before all of the K repetitions have been transmitted, stopping the UE from further transmitting the remaining repetitions can be beneficial for the following reasons:

1. UE battery energy efficiency.
2. Possible collision avoidance on the T-F resource in case gNB is allocating multiple UEs on the same resource (be it 1 resource or multiple resources with some hopping mechanisms).
3. Better spectrum efficiency as gNB can allocate the further resource for grant based UL transmission.

If multiple users share the same resource and it happens that two or more users get active at the same time, and may continue their K transmission on the next occasions, again causing interference, it would be beneficial to quickly move some of the users to different resource. Thus in this case, gNB would like to send early termination indication which is effectively a FAST NAK to users. This could come along with a new resource assignment dedicated for this user. As an example, if 2 or 3 users start their K UL GF repetitions at the same occasion and gNB is able to identify these users due to good correlation properties of DMRS, it can quickly move all but one user to different dedicated resources to be able to have a chance of successful detection.

Sequence for UE to receive Early Termination (ET)

gNB receives the TB and successfully decodes the data. It prepares ET indication (HARQ ACK feedback) and sends in the DL. There could be transmission occasions for the transmission possibility of this ET indication hence it may introduce additional delay. UEs in the transmission phase are supposed to be ready to be able to receive such an indicator. Concerned UE receives this indication, decodes and does not transmit the remaining repetitions of the TB for which it received early termination HARQ response.

Early termination could be handled as follows.

gNB should send an indication on the successful decoding of the TB. Possibilities: A physical channel designed specifically for HARQ feedback, like PHICH in LTE.

Group common DCI.

UE specific DCI.

UL grant can be used to send ACK (though it has many parameters and would incur relatively large overhead).

It could be interesting to have the same ACK/NAK mechanism for Early Termination and for normal HARQ response for UL Grant Free Transmission.

HARQ Feedback Response for UL Grant Free Transmission

Suppose UL grant free transmission is configured with K repetitions where K is an integer at least equal to one.

The situation relating to what would happen when a UE has transmitted one TB (K repetitions) on grant free UL resource(s) is now discussed.

If gNB is successfully able to decode the transport block, it would like to send an ACK. So that UE may free up its HARQ buffer and there are no re-transmissions of this correctly received data.

If gNB data decoding is not successful, gNB would like to have re-transmission of the same TB.

Following are the possibilities for retransmission:
  gNB sends a NAK to the UE and UE starts the retransmission of the same TB on the next UL GF transmission occasion.
  Instead of sending a NAK, gNB may decide to send nothing which can be assumed to be an implicit NAK and UE retransmits the same TB on the next GL occasion.
  Instead of sending a NAK explicitly, gNB can send an UL grant for the same HARQ process number (HPN) which configures the re-transmission of the same TB. This practically implies that transmission moves from Grant Free to Grant Based. This could be very helpful in case when gNB detected collision on the grant free resource from multiple UEs which may potentially collide further if they continue on the grant free resource. UL grant with resources assigned on other PRBs would allow gNB the flexibility to quickly control such interference situations.

If gNB fails to identify even the user (more possibility if K=1, no repetitions) from the RSs either because the user is far away or there is strong interference from multiple users, following are possible.
  Simplest case is that gNB does not transmit anything. But this should come in combination with automatic retransmission possibility for the UE on the next GF transmission occasion.
  If the resource was only assigned to this user and gNB is at least able to detect some transmission power, gNB knows a-priori that only this UE could be transmitting. Then gNB could either resort to sending NAK for re-transmission or send an UL grant for retransmission on the same or different resource.
  If the resource is assigned to multiple users which is a typical case in our understanding, gNB can send a group common UL grant which is somehow associated to GF resource. This can have indication such that it NAKs the current transmission on this specific resource and the concerned UE does re-transmission on the resource sent in this UL grant. Other UEs who have been assigned to the same resource may be able to listen to this UL grant but only the user who did the transmission should retransmit. In addition, how to handle the case if there were two or more users who transmitted and gNB did not identify if it was a collision would be addressed.

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

The invention claimed is:

1. A method of autonomously scheduled transmission within configurations set by a base station via Radio Resource Control from a user equipment (UE) to the base station, the method performed at a UE and comprising:
    transmitting at a first available transmission occasion a corresponding first redundancy version (RV) of a transport block associated with this occasion; and
    transmitting remaining repetitions of the transport block on next available occasions with their associated RVs, wherein an index N is assigned to each transmission occasion and there is a pre-configured RV sequence of length K, where the RV associated with the transmission occasion N is RV(N % K) (%=Modulo operation).

2. A method according to claim 1 where K=3.

3. A UE configured to perform the method of claim 1.

* * * * *